(12) United States Patent
Hunt et al.

(10) Patent No.: US 10,061,402 B2
(45) Date of Patent: Aug. 28, 2018

(54) ORIENTATION CONTROL

(71) Applicant: Lenovo (Singapore) Pte. Ltd., Singapore (SG)

(72) Inventors: John Miles Hunt, Raleigh, NC (US); John Weldon Nicholson, Holly Springs, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/246,790

(22) Filed: Aug. 25, 2016

(65) Prior Publication Data

US 2017/0052604 A1 Feb. 23, 2017

Related U.S. Application Data

(63) Continuation of application No. 13/311,420, filed on Dec. 5, 2011.

(51) Int. Cl.
*G09G 5/00* (2006.01)
*G06F 3/0346* (2013.01)
*G06F 1/16* (2006.01)

(52) U.S. Cl.
CPC .......... *G06F 3/0346* (2013.01); *G06F 1/1626* (2013.01); *G06F 2200/1614* (2013.01); *G06F 2200/1637* (2013.01); *G09G 2340/0492* (2013.01)

(58) Field of Classification Search
CPC ........... G06F 1/1626; G06F 2200/1637; G06F 2200/1614; G06F 15/00; G06F 3/0346; G06F 2203/0384; G06F 3/0383; G09G 2340/0492; G09G 5/00; H04N 21/4126; H04N 13/0239; G01P 15/00; G01P 15/18; G01P 15/14; G01P 15/0888; G01P 3/44; G01P 7/00
See application file for complete search history.

(56) References Cited

U.S. PATENT DOCUMENTS

| 6,674,437 B1 | 1/2004 | Rose | |
|---|---|---|---|
| 2009/0303204 A1* | 12/2009 | Nasiri | A63F 13/06 345/184 |
| 2010/0123660 A1* | 5/2010 | Park | G06F 3/0346 345/157 |
| 2010/0222046 A1* | 9/2010 | Cumming | G06Q 30/02 455/418 |

(Continued)

OTHER PUBLICATIONS

U.S. Appl. No. 15/048,769, Office Action dated Mar. 24, 2017 (26 pages).

(Continued)

*Primary Examiner* — Xilin Guo
(74) *Attorney, Agent, or Firm* — Brian J. Pangrle (57) ABSTRACT

A method can include operating a 3-axis accelerometer having two axes that define a plane and an axis perpendicular to the plane to provide acceleration values for the three axes; increasing a threshold responsive to an increase in magnitude of the acceleration value for the axis perpendicular to the plane or decreasing the threshold responsive to a decrease in magnitude of the acceleration value for the axis perpendicular to the plane; and orienting output to a display in either a portrait format or a landscape format based on comparing the acceleration values for the two axes that define the plane to the threshold.

17 Claims, 9 Drawing Sheets

(56) References Cited

U.S. PATENT DOCUMENTS

| | | |
|---|---|---|
| 2010/0295789 A1 | 11/2010 | Shin |
| 2012/0001943 A1 | 1/2012 | Ishidera |
| 2012/0136573 A1* | 5/2012 | Janardhanan ........ G01C 21/165 701/512 |
| 2012/0210273 A1 | 8/2012 | Seong |
| 2013/0293590 A1 | 11/2013 | Gommier |

OTHER PUBLICATIONS

U.S. Appl. No. 15/048,769, Office Action dated Jul. 14, 2017 (35 pages).
U.S. Appl. No. 15/048,769, Office Action dated Nov. 17, 2017 (36 pages).

* cited by examiner

ORIENTATION CONTROL

RELATED APPLICATION

This application is a continuation of a co-pending U.S. patent application having Ser. No. 13/311,420, filed 5 Dec. 2011, which is incorporated by reference herein.

TECHNICAL FIELD

Subject matter disclosed herein generally relates to techniques for controlling display of information.

BACKGROUND

Various devices include a display where information may be rendered to the display in one of two or more formats. For example, for a rectangular display that includes one side longer than another, such formats can include a portrait format and a landscape format. Further, such formats may be oriented up or down with respect to a device (e.g., to provide four different orientations). Where a display is square, multiple orientations can also exist. Where a device is subject to spatial manipulation (e.g., a handheld device), such manipulation may trigger an undesirable change in orientation of displayed information. As described herein, various technologies, techniques, etc., can provide enhanced orientation control.

SUMMARY

A method can include operating a 3-axis accelerometer having two axes that define a plane and an axis perpendicular to the plane to provide an acceleration value along each of the axes and orienting output to a display in either a portrait format or a landscape format based on comparing the acceleration values for the two axes that define the plane to a threshold that depends on the acceleration value for the axis perpendicular to the plane. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Many devices include circuitry to sense their orientation, which may allow for switching between one or more landscape format orientations and one or more portrait format orientations. An undesirable switch can arise, for example, when a user moves a device with a desired orientation to place it onto a flat surface or other surface (e.g., to lay it down on a table, place it on a dashboard, etc.). Whether the user moves the device temporarily (e.g., due to an interruption), to allow viewing by others, to allow for typing or other activity, etc., such a switch can be annoying. Where a switch does occur, a user will usually manipulate the device until it returns to the desired orientation. Where a user is in a vehicle or performing some type of activity, the annoyance may become a distraction. For example, where a driver instructs a device to display a map (e.g., with driving directions), an undesirable flip in orientation while placing the device onto a dashboard may distract the driver and give rise to a few seconds of inattention to road conditions, vehicle control, etc. As described herein, a mechanism that can control orientation response while a device is being maneuvered (e.g., by hand to a table, a desk, a dashboard, etc.) can prove quite beneficial.

Undesirable orientation changes may be associated with a two-axis approach to orientation control. For example, given a three-dimensional Cartesian coordinate system where a display of a device lies in a xy-plane and a z-axis is orthogonal to that plane, a two-axis approach to orientation control ignores z-axis information and controls landscape and portrait orientations based solely on x-axis and y-axis information. For example, such a two-axis approach to orientation control may make orientation determinations based on a greatest magnitude with respect to gravity for an x-axis that corresponds to an up and a down portrait format orientations and a y-axis that corresponds to an up and a down landscape format orientations. The foregoing type of control mechanism can result in unwanted screen orientation changes because the magnitudes of gravity (G) projected onto the x-axis or the y-axis can be large relative to each other (triggering the orientation) while at the same time being small relative to G projected onto z-axis.

One approach to handling such undesirable changes is referred to as a z-lockout that simply "locks out" changes in orientation once a planar device reaches a specified "lockout" angle with respect to the horizon. As an example, if the planar device reaches an angle of 25 degrees with respect to the horizon (i.e., 65 degrees with respect to gravity), no changes can occur in orientation of an image being displayed on the device.

As described herein, as an example, a mechanism can optionally disable or limit sensitivity of orientation control when gravity aligns with the z-axis to a certain extent (e.g., according to an appropriate tilt angle). Such a mechanism can act to eliminate unwanted changes as a device is laid down onto a flat surface (e.g., a desk, a table, etc.). Such a mechanism can optionally include a table of thresholds for magnitude of G projected onto a z-axis, for example, to determine a relative difference in magnitude of G projected onto an x-axis or a y-axis (e.g., including hysteresis levels) that are necessary in order to cause a change in orientation.

Figure 1:
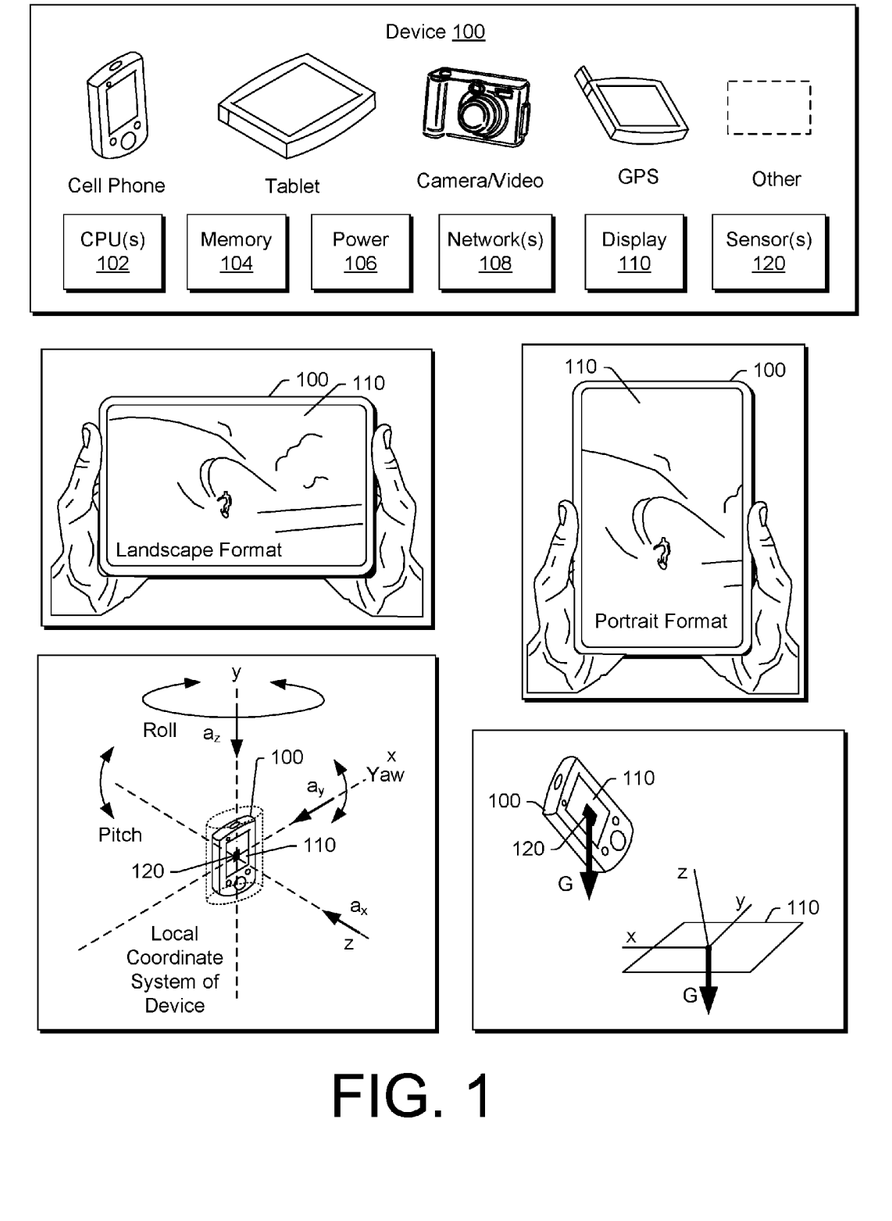
FIG. 1 is a diagram of examples of various configurations of a device along with some examples of sensor technology.

FIG. 1 shows various configurations of a device 100. The device 100 may be configured as a cell phone, a tablet, a camera (e.g., still, video, still and video), a GPS device or other device. The device 100 may include one or more features from at least one of the aforementioned devices. The device 100 includes particular features such as one or more processors 102, memory 104, power source 106, one or more network interfaces 108, at least one display 110 and one or more sensors 120.

As shown in FIG. 1, the device 100 can allow for rendering information to the display 110 in a landscape format or a portrait format. In the example of FIG. 1, the device 100 may be hand-holdable by one or two hands where a user may manipulate the device 100 to cause rendering of information to the display 110 according to a desired format or orientation.

FIG. 1 shows an example of a sensor 120 that can detect acceleration, twist (e.g., roll, pitch, yaw) or a combination of acceleration and twist. The sensor 120 may be configured to distinguish an angle with respect to gravity. In the example of FIG. 1, the display 110 of the device 100 lies in a xy-plane and the sensor 120 may be configured with one or more axes coincident with the x-axis, the y-axis or both the x- and y-axes. In the example of FIG. 1, the sensor 120 can be configured to sense acceleration with respect to the z-axis. The sensor 120 can optionally include a gyroscope and a three-axis accelerometer, which may be configured to sense motion with up to six degrees of freedom.

As an example, the sensor 120 can optionally be a sensor that includes various features of a commercially available such as the LIS302DL MEMS motion sensor marketed by STMicroelectronics (Geneva, Switzerland). The LIS302DL MEMS motion sensor is a three axes linear accelerometer that includes a sensing element and an IC interface to provide measured acceleration (e.g., I$^2$C/SPI serial interface). The LIS302DL sensor includes selectable scales and can measure accelerations with an output data rate of 100 Hz or 400 Hz. Inertial free-fall and wake-up interrupt signals can be generated when a programmable acceleration threshold is crossed at least in one of the three axes. The LIS302DL sensor includes programmable thresholds and timings for interrupt generators. As another example, the sensor 120 can optionally be a sensor that includes various features of a commercially available such as the MMA8450Q three axes accelerometer marketed by Freescale Semiconductor (Austin, Tex.).

Figure 2:
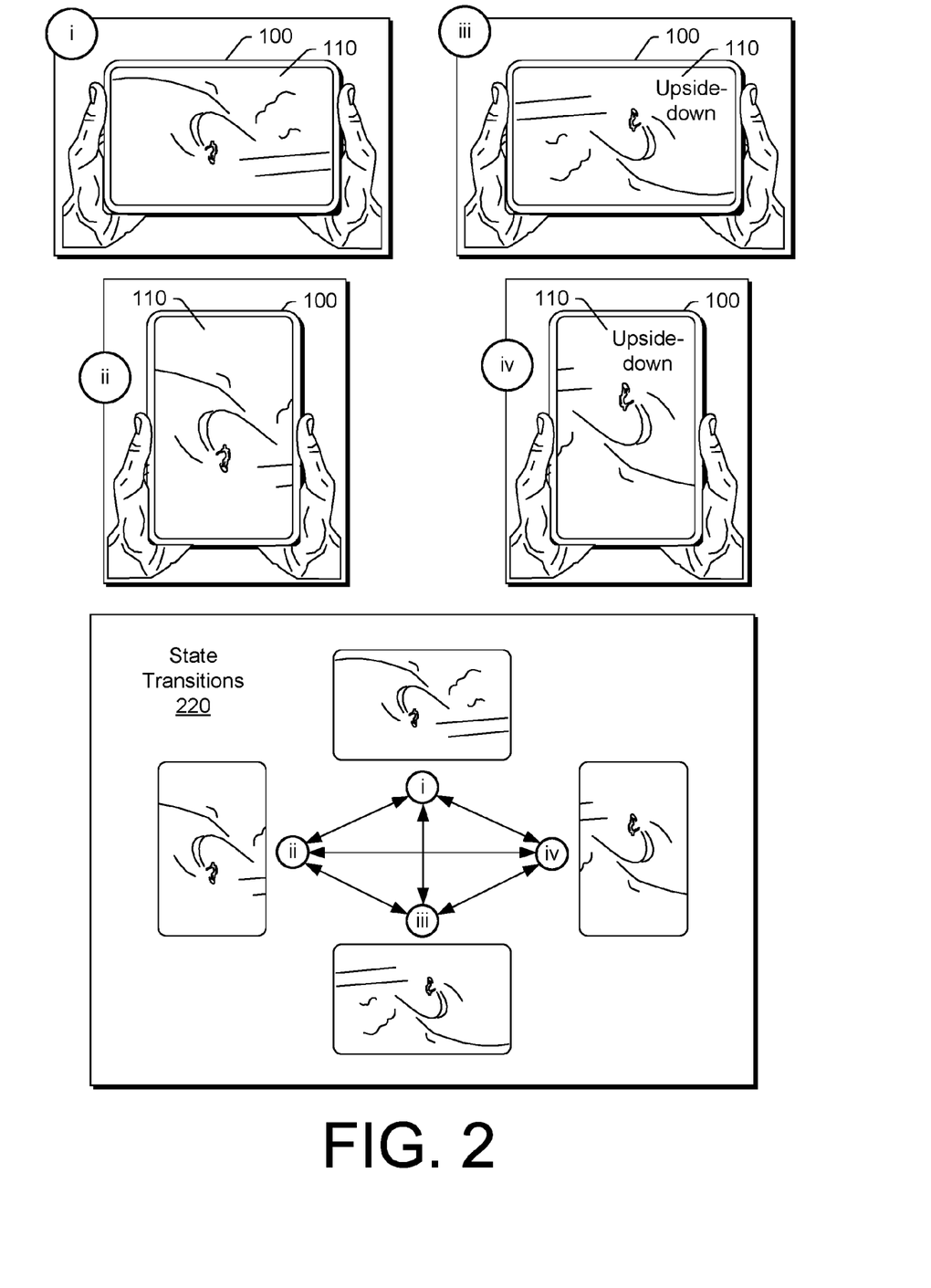
FIG. 2 is a diagram of examples of various orientation states and state transitions for a device.

FIG. 2 shows some example orientations of the device 100 of FIG. 1 along with a state transition diagram 220. The state transition diagram 220 indicates that transitions may occur between various states, including a landscape format right side-up orientation state (i), a portrait format right side-up orientation state (ii), a landscape format right side-down orientation state (iii) and a portrait format right side-down orientation state (iv).

Figure 3:
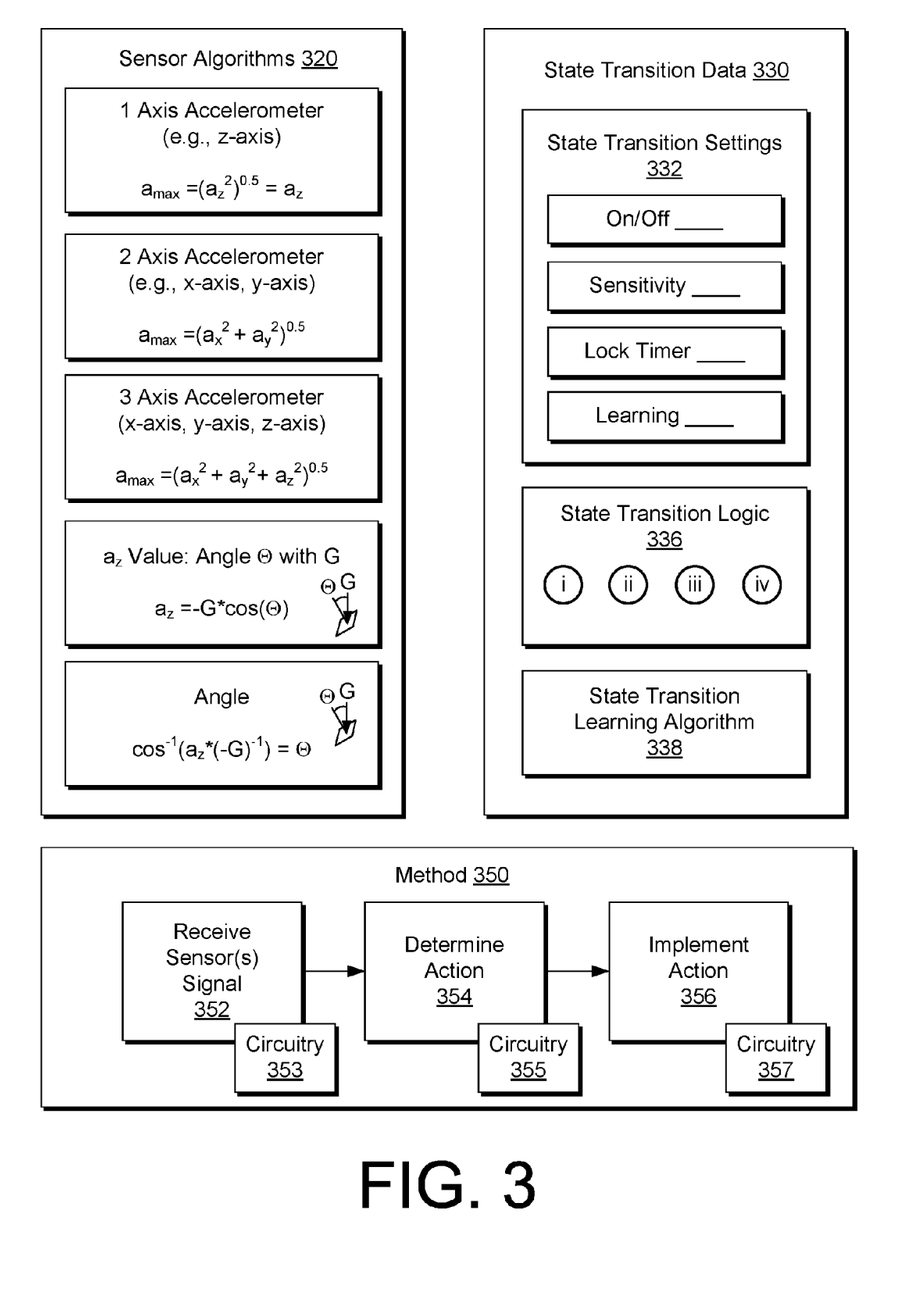
FIG. 3 is a diagram of examples of sensor algorithms, state transition data and a method.

FIG. 3 shows some examples of algorithms 320, some examples of state transition data 330 and an example of a method 350. The algorithms 320 include a single axis algorithm, a dual axes algorithm, a three axes algorithm, a force and angle with respect to gravity algorithm and an angle with respect to gravity algorithm. While various axes are mentioned (e.g., x, y and z) for some of the example algorithms 320, an algorithm may include other axes (e.g., a single axis y, a dual axes z and x, etc.).

As to the state transition data 330, such data can include state transition settings 332 (e.g., on/off, sensitivity, lock timer, learning, etc.), state transition logic 336 (e.g., allowed transitions, disallowed transitions, transition sequence order, etc.), and one or more state transition learning algorithms 338 (e.g., to learn behavior of a user, optionally with respect to type of information being rendered to a display such as browser, map, GPS, video, etc.).

The method 350 includes a reception block 352 that receives one or more sensor signals, a determination block 354 to determine action based at least in part on the one or more received sensor signals and an implementation block 356 to call for implementation of action (e.g., as determined per the determination block 354). In the example of FIG. 2, the blocks are shown along with circuitry 353, 355 and 357 configured to perform various functions.

Figure 4:
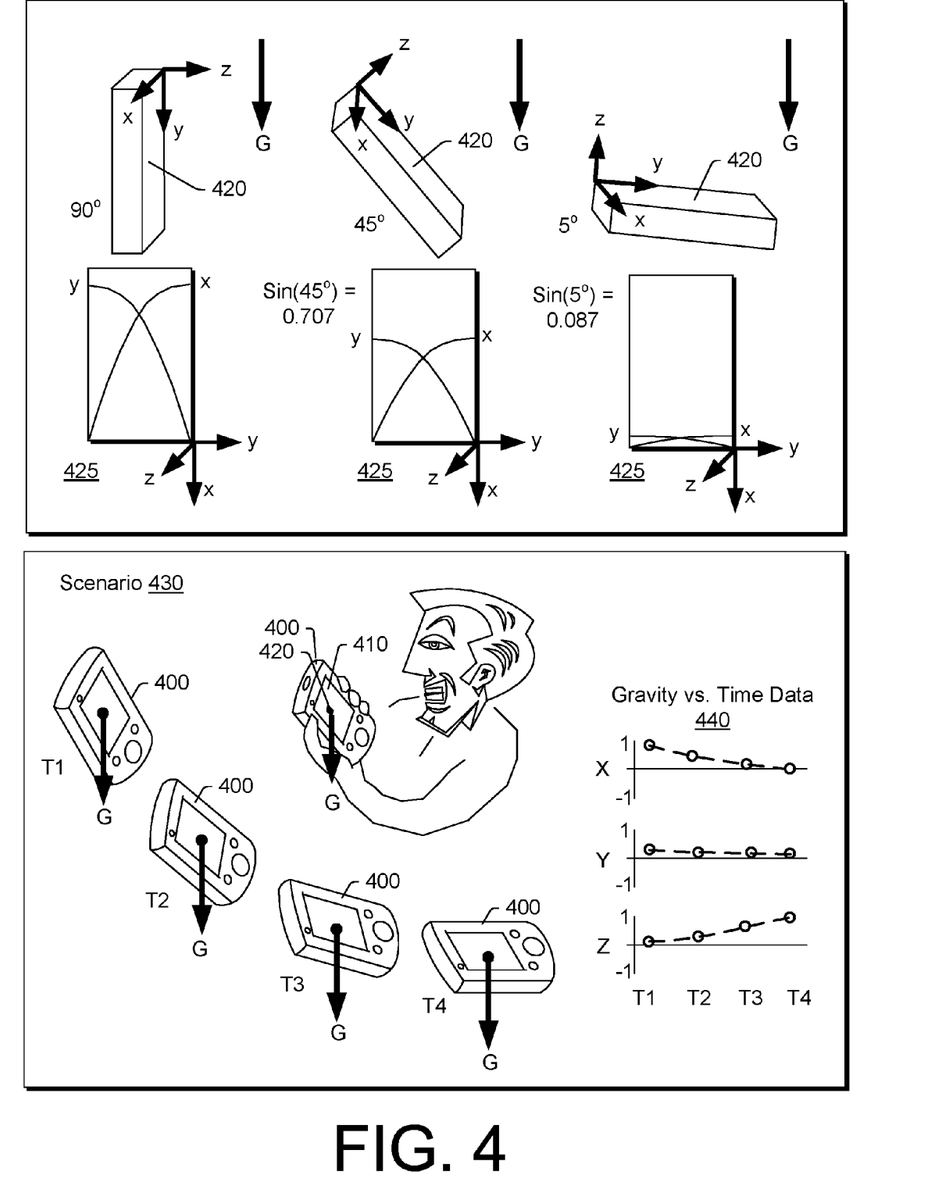
FIG. 4 is a diagram of an example of a scenario for handling a device.

FIG. 4 shows an example of a device 400 that includes a display 410 and a sensor 420 along with an example of a scenario 430 and gravity versus time data 440. In the example of FIG. 4, the sensor 420 provides for sensing along three axes x, y and z. As the sensor 420 rotates with respect to gravity from the z-axis being orthogonal to gravity to the z-axis being aligned with gravity (e.g., 90 degrees to 0 degrees with respect to gravity), the maximum magnitude of the signals along for the x-axis and the y-axis diminishes. Plots 425 of magnitudes along the x-axis and the y-axis are also shown where rotation occurs about the z-axis in a counter-clockwise direction (see, e.g., "pitch" in FIG. 1). As a 90 degree pitch rotation occurs, the x-axis becomes aligned with gravity and consequently, magnitude along the x-axis is at a maximum; noting that further rotation of 90 degrees would result in another maximum magnitude (e.g., minimum negative value). As indicated, in the example of FIG. 4, the magnitudes for the x-axis and the y-axis cross for a pitch angle of 45 degrees.

While magnitudes are shown, given acceleration values (e.g., which may be positive or negative or offset), an angle may be determined for the sensor 420 with respect to rotation about the z-axis (see, e.g., "pitch" in FIG. 1). For the device 400, pitch angle can indicate whether a long edge or a short edge of the display 410 is up, for example, with respect to gravity. The device 400 can include circuitry that determines a pitch angle based on x-axis and y-axis accelerometer readings and compares the pitch angle to a threshold (e.g., a "trip angle"). In some instances, hysteresis control may provide for two thresholds: one threshold to orient from a portrait format to a landscape format and another threshold to orient from a landscape format to a portrait format where, for example, a portrait to landscape threshold may be less than a landscape to portrait threshold.

In the scenario 430, a user manipulates the device 400 over a period of time including times T1, T2, T3 and T4. As the user manipulates the device 400, the sensor 420 acquires data with respect to gravity 440. As indicated, at time T4, the device is lying on a relatively flat, horizontal surface. As the z-axis is normal to the xy-plane, the sensor 420 senses a gravity of approximately 1 for the z-axis and lesser gravity readings for the x-axis and the y-axis; noting that if the device 400 was flipped over (i.e., the display 410 down), the gravity would be approximately −1 for the z-axis.

As mentioned, a sensor may sense at a rate of a hundred hertz or more. In the scenario 430, the user may complete the motion in less than a few seconds, which would allow for acquisition of several hundred data points for each axis being sensed. As described herein, such data may optionally be analyzed in near real time to determine rate or other parameters associated with movement and orientation in space. As described herein, display orientation control circuitry of a device may act to control orientation of information rendered to a display based on, or responsive to, sensing data, analyzing sensed data, etc.

Figure 5:
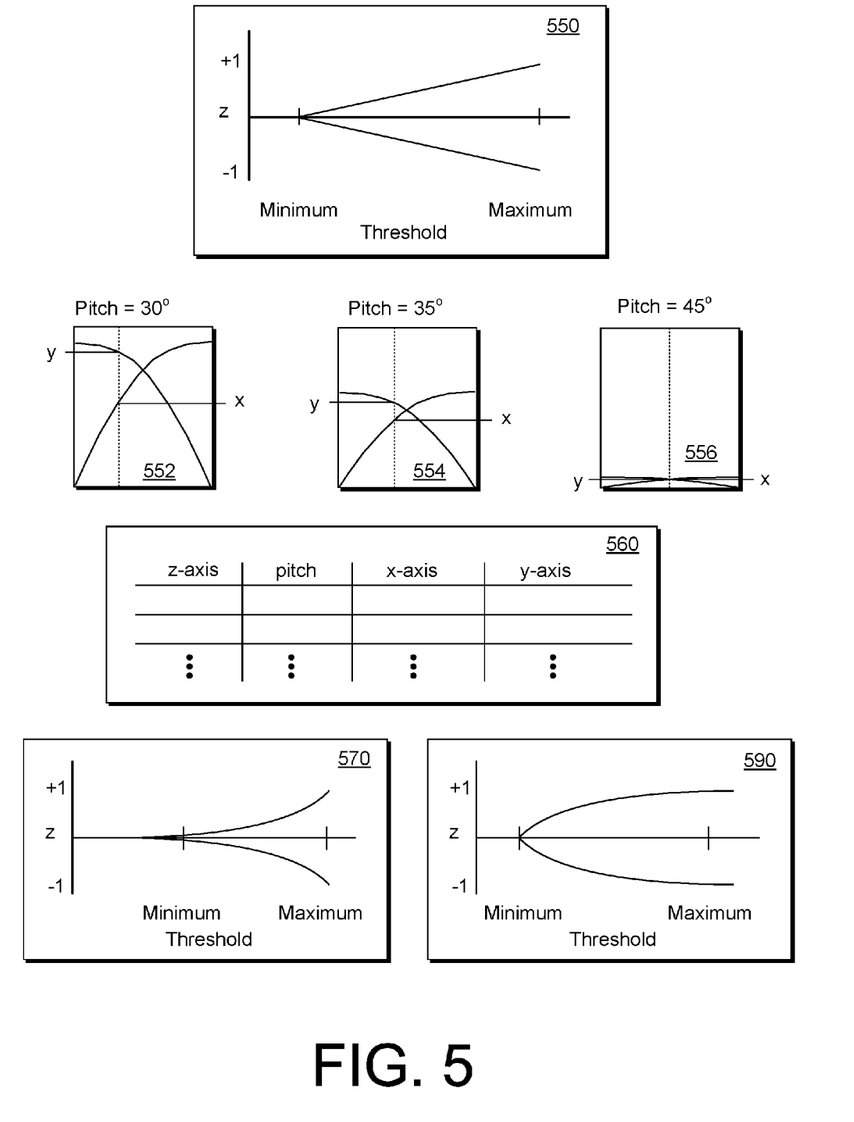
FIG. 5 is a diagram of examples of adjustments for a device.

FIG. 5 shows some examples of a threshold or thresholds that depend on how a device is oriented with respect to gravity. In a plot 550 of acceleration along an axis perpendicular to a planar display of a device versus threshold, as the axis aligns with gravity (e.g., up or down), the threshold increases. For example, as the device is rotated from an orientation where the y-axis aligned with gravity to an orientation where the z-axis becomes aligned with gravity, the threshold for triggering a change from one format to another increases. In the example of FIG. 5, for the y-axis aligned with respect to gravity, per the plot 552, the threshold is 30 degrees (e.g., pitch angle), where the z-axis is at about 45 degrees with respect to gravity, per the plot 554, the threshold is 35 degrees (e.g., pitch angle), and where the z-axis is about 5 degrees with respect to gravity, per the plot 556, the threshold is 45 degrees (e.g., pitch angle).

FIG. 5 also shows a table 560 that includes a z-axis column, a pitch angle column, an x-axis column and a y-axis column. The table 560 may be implemented by reading a register of an accelerometer for a z-axis value and then determining a pitch angle based at least in part on the z-axis value. As indicated, each pitch angle corresponds to a particular n-tuple, for example, a 2-tuple (e.g., a duple) of an x-axis value and a y-axis value. As an alternative, the table 560 may exclude the pitch angle column and determine an n-tuple based at least in part on a z-axis value. In other words, the pitch angle may be inferred from an n-tuple (e.g., including x-axis and y-axis values) or vice versa. In the example of FIG. 5, the pitch angle and the x-axis and y-axis values depend on the z-axis value. Accordingly, the pitch angle, or a corresponding tuple, may be viewed as dynamic thresholds that depend on z-axis information.

FIG. 5 also shows plots 570 and 590 of non-linear relationships between z-axis information and threshold (e.g., as a pitch angle). The plot 570 shows that a minimum threshold is implemented for z-axis values less than a certain absolute value while a maximum threshold is implemented for z-axis values of +1 or −1 (e.g., with respect to gravity). In between, the threshold changes rapidly for small changes in z-axis values until about +/−0.5. For the plot 590, the threshold changes slowly for changes in z-axis values until about +/−0.5 where, thereafter, a small change in a z-axis value leads to a large change in the threshold (e.g., up to a maximum threshold).

As an example, a device may operate such that, as the device was lowered to horizontal, it would take a larger shift in position to trigger an orientation change. Such a scheme may act to change a portrait to landscape threshold, a landscape to portrait threshold, a portrait to landscape and a landscape to portrait threshold or both a portrait to landscape threshold and a landscape to portrait threshold responsive to a z-axis reading in a linear, a non-linear or a linear and non-linear manner.

Figure 6:
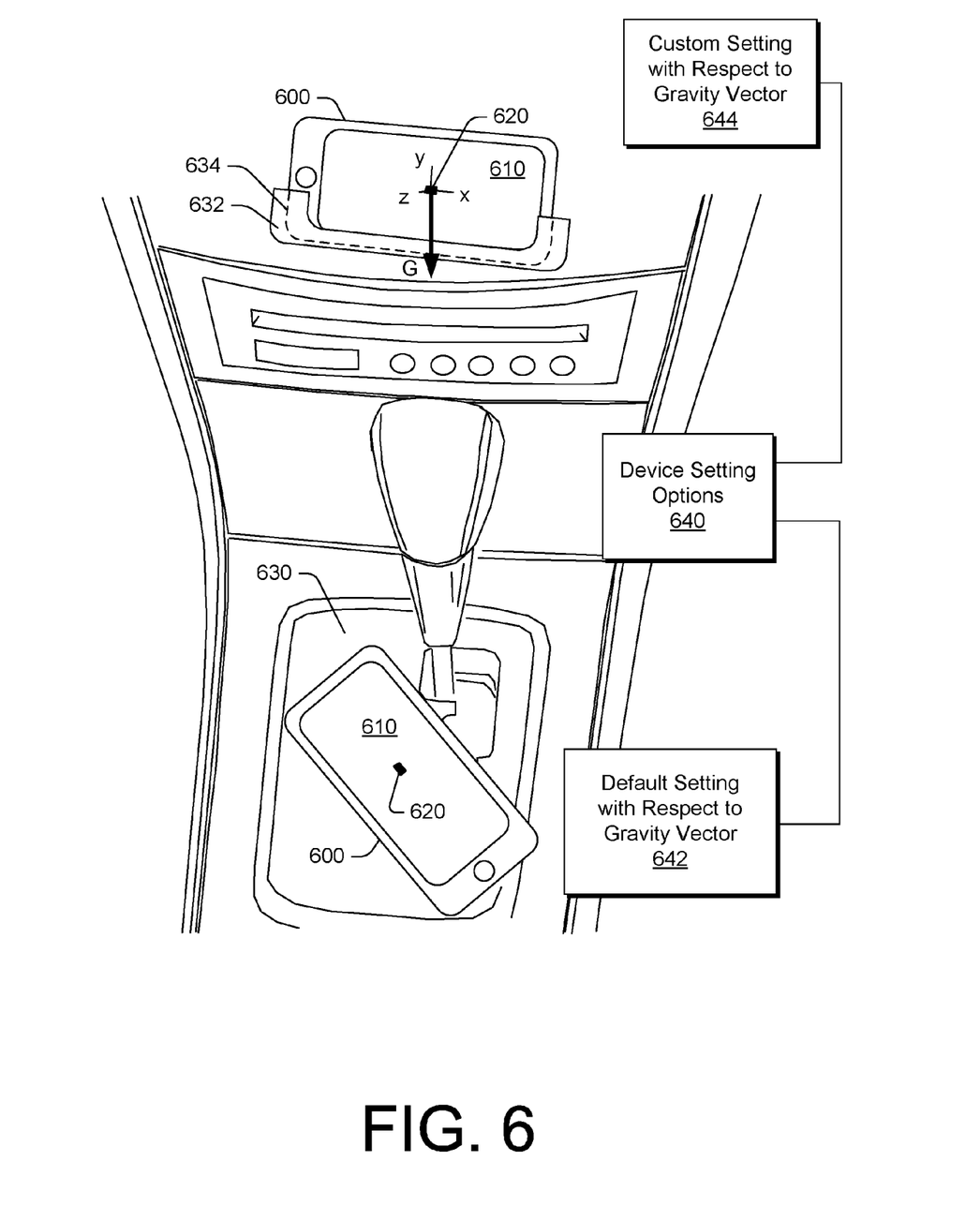
FIG. 6 is a diagram of examples of settings for a device.

FIG. 6 shows an example of a device 600 that includes a display 610 and a sensor 620 may be manipulated and positioned with respect to one or more surfaces such as a relatively flat, horizontal surface 630 and an angled, cradle surface 634 of a cradle or mount 632. In the example of FIG. 6, the device 600 includes device setting options 640, including a default setting with respect to a gravity vector 642 and a custom setting with respect to a gravity vector 644.

As to the default setting 642, an increase in the magnitude of a gravity vector normal to the xy-plane (e.g., plane of the display or parallel to that of the display) may cause the device 600 to adjust a threshold for purposes of orienting information rendered to the display 610 or lock an orientation of information rendered to the display 610. Such a setting may correspond to a flat, horizontal surface mode. In contrast, the custom setting 644 may include an offset from a normal vector that corresponds to a mount mode, optionally set by user instruction, learning, etc.

As an example, the table 560 of FIG. 5 may shift entries to accommodate a z-axis offset from a default setting or another table may be used in response to a custom setting. A custom setting may be automatic or may be responsive to user input, a particular application being used, etc. The table 560 of FIG. 5 or other table may optionally be state transition data for implementing state transition logic (see, e.g., FIG. 3).

As shown in FIG. 6, the device 600 may reside in the cradle or mount 632 for extending periods of time and the device 600 may rank its cradle or mount position as a frequently occurring position. In turn, the device 600 may automatically set an orientation lock (or other orientation setting such as an offset, etc.) when the device 600 approaches the cradle or mount position. In instances where a user adjusts the cradle or mount 632, the device 600 may automatically relearn and use the new, adjusted position for purposes of orientation control. Such relearning may include a bidirectional ranking algorithm that tracks the fall in ranking of one position and the rise in ranking of another to thereby replace the falling position with the rising position.

As another example, the device 600 may include a tap feature where a user can tap the device 600 (e.g., optionally with a tap sequence) to cause the device 600 to define a custom setting. In such an example, upon positioning the device 600 in the cradle or mount 632, the user may double tap the device 600 (e.g., on an edge of the device 600) to thereby cause the device 600 to define a custom setting that corresponds to the position of the device 600 in the cradle or mount 632 (e.g., to adapt, adjust or substitute a table, equation, parameter, etc.).

With respect to the enabling one or more settings, whether default, custom or custom and default, the device 600 may include a tap feature, a gesture feature, a shake feature, etc., that causes the device 600 to enable (or disable) orientation control. For example, where a cell phone is used to display a map, a user may tap the phone quickly to enable a custom setting that allows for a custom orientation adjustment, a custom orientation locking or that optionally locks orientation. As to tapping a device, sensor circuitry can include tap detection features (e.g., acceleration due to tapping). Thus, a device can optionally include sensor circuitry configured for both tap detection and orientation control where tap detection can be used as input for setting orientation control.

Figure 7:
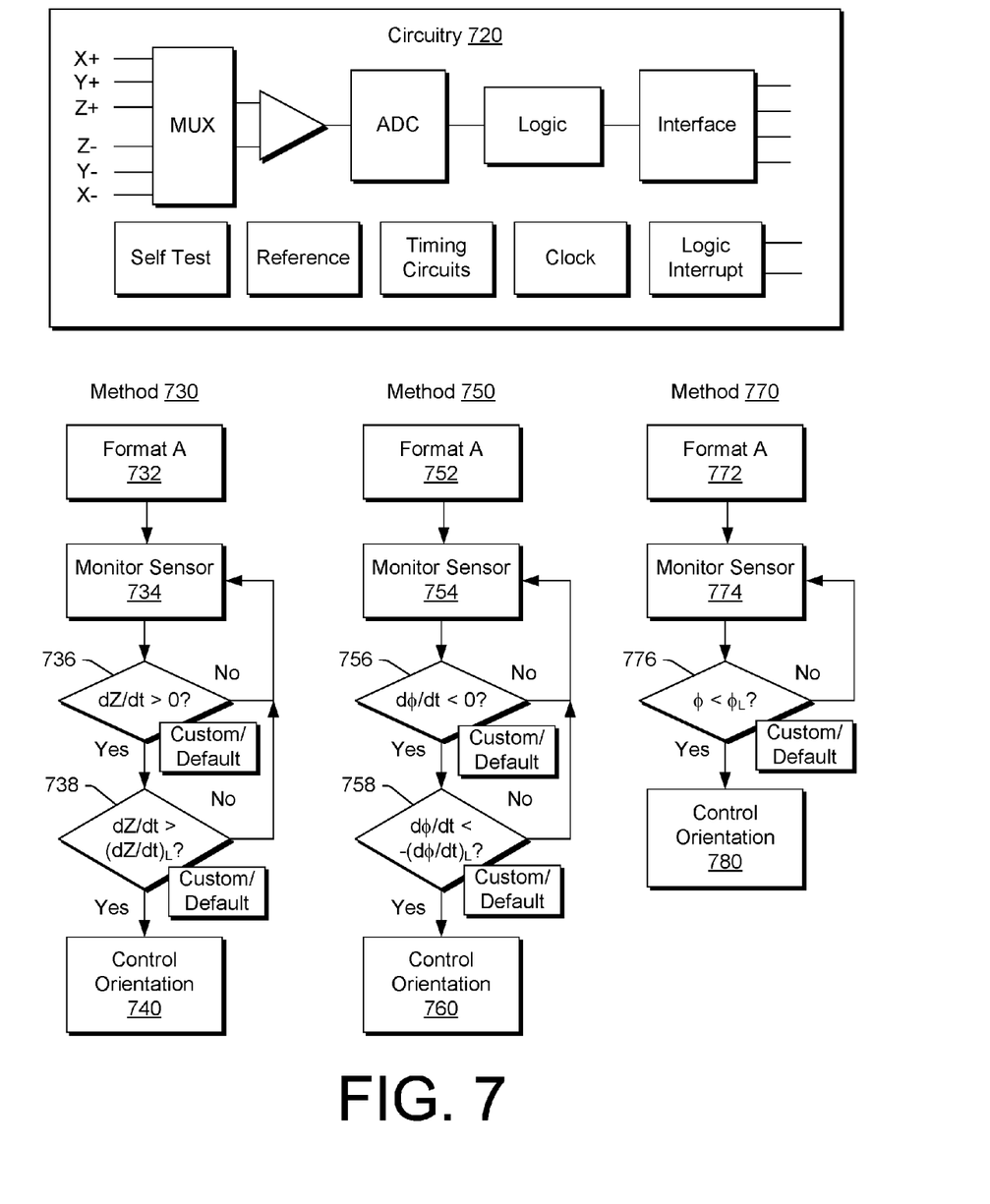
FIG. 7 is a diagram of an example of sensor circuitry and examples of methods.

FIG. 7 shows an example of sensor circuitry 720 along with examples of methods 730, 750 and 770. The circuitry 720 includes a multiplexer (MUX) configured to receive signals from sensors in three axes and to direct the information to an amplifier that amplifies the signals for receipt by an analog-to-digital converter (ADC). The ADC can provide digital output to logic circuitry. As shown, the logic circuitry can receive and transmit information via an interface (or interfaces), which may optionally operate according to one or more standards (e.g., I$^2$C, SPI, etc.). The circuitry 720 can include a self test block, a reference block, timing circuits, a clock, one or more logic interrupts, etc.

In the example of FIG. 7, the circuitry 720 can include digital signal processing (DSP) circuitry, which may provide for features such as a configurable buffer (e.g., FIFO, circular, etc.), free-fall and motion detection, transient detection (e.g., fast motion, jolt), enhanced orientation with hysteresis and optionally z-lockout, shake detection, tap and multi-tap detection, etc.

As to z-lockout, the aforementioned MMA8450Q sensor includes a z-lockout feature that relies on a z-angle to lockout transitions between portrait and landscape formats. For the MMA8450Q, the angle is set to one of 8 angles ranging between 25 degrees and 50 degrees. Such an approach is static and does not depend on rate of movement, offsets, custom settings, etc., and can account for surfaces within the z-angle lockout limits only. In contrast, a dynamic approach can alter lockout, one or more orientation thresholds, etc., and optionally gather information that may help to understand a user's intent such that operation is not necessarily limited to a static z-lockout angle that is referenced solely to alignment directly with or directly against Earth's gravity (e.g., or an equivalent reference system with an angle defined with respect to the horizon being a plane and Earth's gravity being normal to that plane, which may be a "sine" reference as opposed to a "cosine" reference as in FIG. 3).

As described herein, circuitry may account for hysteresis as to landscape to portrait and portrait to landscape transitions (e.g., by using different trip angles). As described herein, circuitry may account for user movement hysteresis. For example, characteristics of user movement to place a device onto a surface can differ from characteristics of user movement when picking up the device from the surface. As an example, a user may place a device more rapidly onto a surface compared to picking up the device from the surface (e.g., due to grasping time to get fingers positioned with respect to the device). Thus, circuitry to control orientation may depend on one or more set-down parameters (e.g., values, angles, accelerations, etc.) and one or more different pick-up parameters (e.g., values, angles, accelerations, etc.).

In the example of FIG. 7, the circuitry 720 can include features to issue an interrupt responsive to an inertial event based on one or more of the sensed signals. For example, a threshold may be set for an axis where sensing an acceleration in excess of the threshold triggers issuance of an interrupt. Such an interrupt may be directed to a control block for controlling orientation of information being rendered to a display, for example, to lock the orientation or take other action. As described herein, such an interrupt may be implemented for one or more other purposes in addition to orientation control. For example, such an interrupt may also be a free-fall interrupt. Such an interrupt may be multi-threshold, for example, a first acceleration causes an orientation lock whereas a second, faster acceleration causes a device shut down (e.g., protective action responsive to dropping the device). Such an approach may be referred to as a tiered threshold approach where actions are triggered responsive to increasing, decreasing or other changes in acceleration (e.g., optionally multi-axis changes).

As shown in FIG. 7, the method 730 includes a format block 732 for a particular display format (e.g., Format A). In a monitor block 734, one or more sensors are monitored for information. In a decision block 736, a decision is made as to whether a derivative of a sensor signal is greater than zero. If the decision block 736 decides that the derivative is not greater than zero, the method 730 continues at the monitor block 734. However, if the decision block 736 decides that the derivative is greater than zero, the method 730 continues in another decision block 738, which decides whether the derivative is greater than a derivative limit. If the decision block 738 decides that the derivative is not greater than the derivative limit, the method 730 continues at the monitor block 734. However, if the decision block 738 decides that the derivative is greater than the derivative limit, the method 730 continues to a control block 740 that acts to control orientation of information rendered to a display.

In the example of FIG. 7, "Z" in the method 730 may correspond to an axis normal to a display (e.g., a xy-plane) or an offset axis (e.g., transformed axis), for example, as described with respect to FIG. 6. Further, depending on coordinate configuration, one or more signs may be changed (e.g., plus or minus, greater than to less than, etc.). The purpose of the decision block 736 is to determine whether movement is toward a position corresponding to a greater Z magnitude while the purpose of the decision block 738 is to determine whether movement toward that position is occurring above a certain speed. Further, the decision block 738 may further include a timer that optionally provides times for an integral feature to estimate a distance moved (e.g., integral of dZ/dt with respect to time). As an example, if a distance moved exceeds a distance limit, it may be inferred that a user is moving the device from one position to another (see, e.g., the scenario 430 of FIG. 4).

As shown in FIG. 7, the method 750 includes a format block 752 for a particular display format (e.g., Format A). In a monitor block 754, one or more sensors are monitored for information. In a decision block 756, a decision is made as to whether a derivative of a sensor signal is less than zero. If the decision block 756 decides that the derivative is not less than zero, the method 750 continues at the monitor block 754. However, if the decision block 756 decides that the derivative is less than zero, the method 750 continues in another decision block 758, which decides whether the derivative is less than a derivative limit. If the decision block 758 decides that the derivative is not less than the derivative limit, the method 750 continues at the monitor block 754. However, if the decision block 758 decides that the derivative is less than the derivative limit, the method 750 continues to a control block 750 that acts to control orientation of information rendered to a display.

In the example of FIG. 7, the parameter $\phi$ may be an angle of a normal to a display plane with respect to gravity. For example, as the normal aligns with gravity, the angle $\phi$ decreases. As with the method 730, the normal may be with respect to gravity or correspond to a direction offset (e.g., transformed) with respect to gravity. As shown in the example of FIG. 6, a custom setting 644 may be set (e.g., by a user, by an algorithm, etc.) to correspond to a particular position. In such an example, the parameter $\phi$ may be measured with respect to the direction of the z-axis when the device 600 is in the cradle or mount 632. Thus, the method 750 can act responsive to information indicative of a user moving a device to a particular, custom position.

As shown in FIG. 7, the method 770 includes a format block 772 for a particular display format (e.g., Format A). In a monitor block 774, one or more sensors are monitored for information. In a decision block 776, a decision is made as to whether a value of a parameter is less than a parameter limit. If the decision block 776 decides that the value is not less than the value limit, the method 770 continues at the monitor block 774. However, if the decision block 776 decides that the value is less than the value limit, the method 770 continues at a control block 780 that acts to control orientation of information rendered to a display.

Referring to the example of FIG. 6, where the parameter is an angle, the angle may be an angle associated with a default setting such as the setting 642 or an angle associated with a custom setting such as the setting 644. As mentioned, a device can optionally include circuitry to automatically detect a custom setting (e.g., via ranking of frequent positions). Such an approach may act to maintain a default setting, disable a default setting or rely solely on learned settings that correspond to frequent positions. Alternatively, or additionally, a device may include circuitry that allows for user input for one or more default settings, one or more custom settings, etc.

Figure 8:
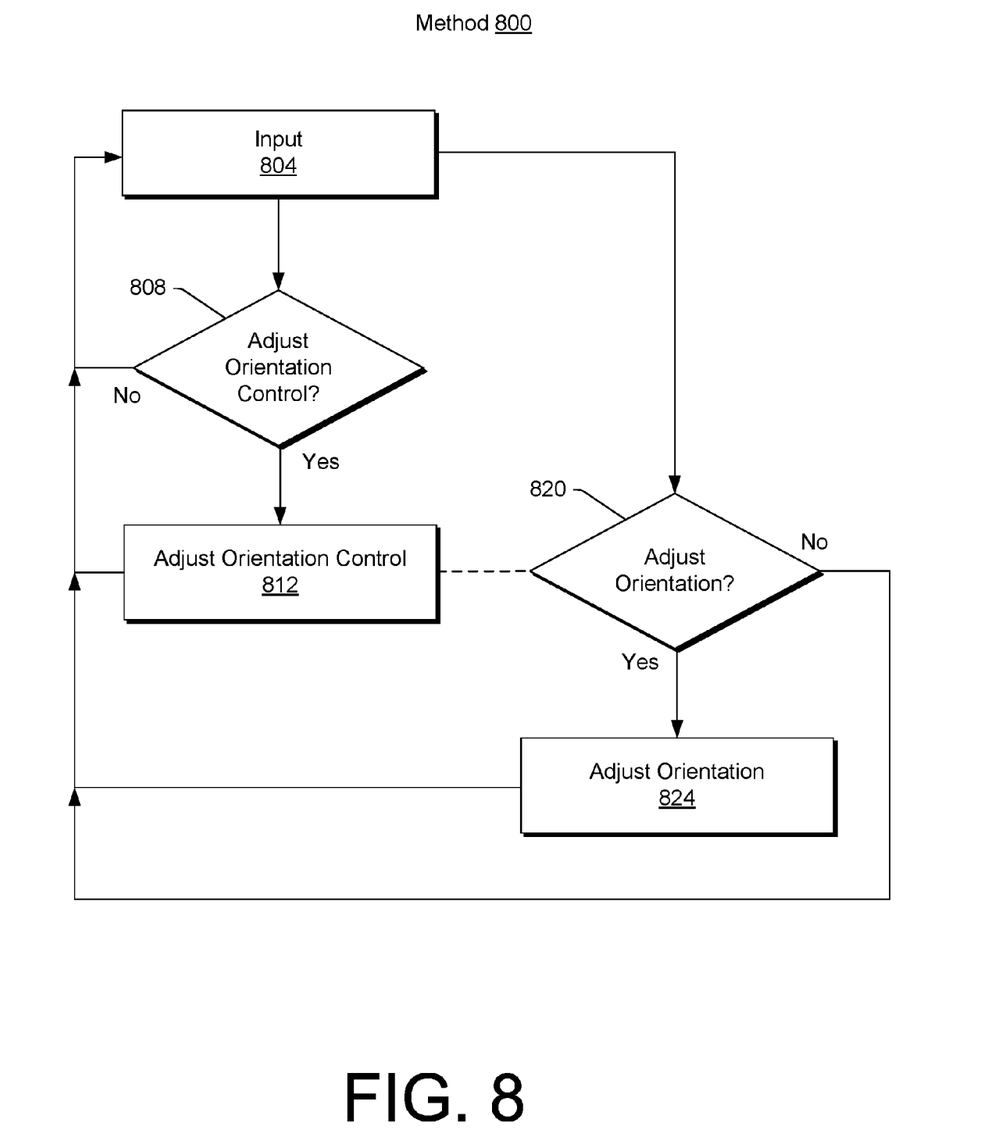
FIG. 8 is a diagram of an example of a method.

FIG. 8 shows an example of a method 800 that includes an input block 804 that provides information to two decision blocks 808 and 820. The decision block 808 decides if an adjustment should be made to orientation control while the decision block 820 decides whether an adjustment should be made to orientation of information rendered to a display. The decision block 820 may operate according to a default setting or a custom setting that determines whether an adjustment should be made to orientation of information rendered to a display. In either instance, the setting may optionally be dynamic and depend on input per the input block 804 (e.g., sensor input, application input, user input, etc.).

As shown in the example of FIG. 8, the decision block 808 decides based at least in part on input from the input block 804 whether to adjust orientation control (e.g., adjust one or more parameters for an orientation control process). Where the decision block 808 decides not to adjust orientation control, the method 800 continues at the input block 804. However, if the decision block 808 decides that adjustment is appropriate, the method 800 continues at an adjustment block 812 that adjusts orientation control. As indicated, the adjustment block 812 can inform the decision block 820. For example, the adjustment block 812 may adjust a pitch angle threshold based on an accelerometer reading. In turn, the decision block 820 will rely on the pitch angle threshold and input received from the input block 804 to decide if an adjustment to orientation should be made by the adjustment block 824. In such a manner, the method 800 can make dynamic decisions as to orientation control that may enhance a user's experience.

As to the decision blocks 808 and 820, such decisions may be made on any of a variety of factors. For example, where a device shuts down, a device switches applications, a device moves from its position to another position, where a device timer expires, where an application executing on the device issues a command, etc., a decision process may be effected, which, in turn, impacts whether or how an orientation adjustment may be made. A reset may optionally occur (e.g., to a default setting) in response to tapping a device, inputting a gesture (e.g., via a display), shaking a device, etc.

As described herein, a method may optionally operate to slow down or delay circuitry. For example, if a device is being moved in a particular direction, rate, etc., a command may be issued to delay action of format control circuitry, display circuitry, etc. In such an example, responsive to movement of the device, data may be ignored, analysis foregone, etc., for a period of time such that an orientation of information being rendered to a display does not change. Such an approach may be referred to as a blanking or blackout period that acts to maintain a particular orientation. Recovery or release from one or more blanking or blackout periods may occur automatically (e.g., expiration of a timer) or in response to user or other input (e.g., input from an application). As an example, upon receipt of a communication such as a phone call, a text message, etc., an instruction may be issued to ignore orientation control, optionally with an accompanying instruction to rendering of information to a display in a particular orientation.

A device may optionally include a graphical user control or other control to associate one or more orientation control settings with one or more applications. Such applications may include a map application, a video application, a phone application, a text message application, an email application, a slideshow application, a web browser application, etc.

As described herein, a method can include operating a 3-axis accelerometer having two axes that define a plane and an axis perpendicular to the plane to provide an acceleration value along each of the axes and orienting output to a display in either a portrait format or a landscape format based on comparing the acceleration values for the two axes that define the plane to a threshold that depends on the acceleration value for the axis perpendicular to the plane. In such a method, the threshold may increase with respect to an increase in the acceleration value for the axis perpendicular to the plane. An acceleration value for an axis perpendicular to a plane may correspond to an angle with respect to gravity, for example, such that a threshold depends directly on the angle of the plane with respect to gravity.

As described herein, a threshold may include a linear relationship with respect to the acceleration value for the axis perpendicular to the plane or may include a non-linear relationship with respect to the acceleration value for the axis perpendicular to the plane or a combination of linear and non-linear relationships. As described herein, a threshold may include a constant value for an acceleration value for the axis perpendicular to the plane greater than an upper limit, a constant value for an acceleration value for the axis perpendicular to the plane less than a lower limit or a combination of both.

As described herein, a threshold may depend on a time derivative of acceleration, for example, a time derivative of acceleration for the axis perpendicular to the plane. As described herein, a method may include locking a format responsive to a determined rate of change in acceleration greater than a predetermined rate.

As described herein, various acts, steps, etc., can be implemented as instructions stored in one or more computer-readable media. For example, one or more computer-readable media can include computer-executable instructions to instruct a device to read data from a 3-axis accelerometer; adjust an orientation change limit based on read data for a first axis; compare read data for a second axis to read data for a third axis; and output an orientation control signal based on the orientation change limit and the comparison of read data for a second axis to read data for a third axis. In such an example, the instructions to instruct a device to output an orientation control signal may include instructions to instruct the device to render information to a display in a portrait format orientation or a landscape format orientation or the instructions to instruct a device to adjust an orientation change limit may include instructions to instruct the device to determine a change in at least one magnitude of acceleration with respect to gravity.

As described herein, a communication device can include a planar display; circuitry to measure an angle of a vector perpendicular to the planar display with respect to gravity and to measure an angle of rotation of the planar display; circuitry to adjust a threshold based on the measured angle of the vector perpendicular to the planar display; and circuitry to orient output to the planar display in a first orientation or a second orientation based on a comparison of measured angle of rotation of the planar display to the threshold (e.g., based on the angle of rotation and the threshold). Such a device may include a rectangular planar display where the first orientation and the second orientation are a portrait orientation and a landscape orientation. As described herein, a device can include an operating system where circuitry to orient output to a planar display includes circuitry to instruct the operating system. A device may include an application where circuitry to orient output to a planar display includes circuitry to instruct the application (e.g., directly or via an operating system). A device may include a 3-axis accelerometer, for example, provided as circuitry to measure acceleration and to provide values to one or more other circuits. As described herein, a communication device can include one or more network circuits to connect to one or more networks (e.g., Internet, cellular, BLUETOOTH®, etc.).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 9:
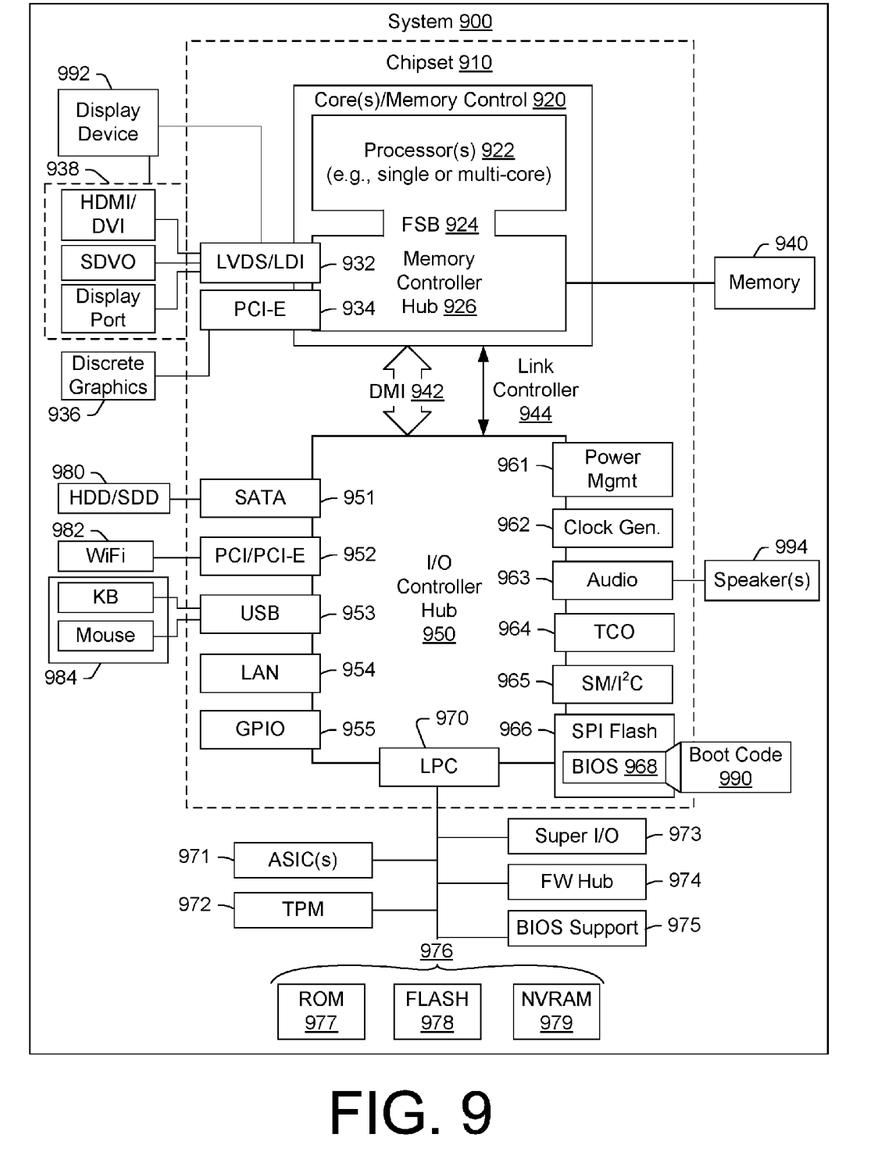
FIG. 9 is a diagram of an example of a system, which may be part of a device.

While various examples of circuits or circuitry have been discussed, FIG. 9 depicts a block diagram of an illustrative example of a computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a device may include other features or only some of the features of the system 900.

As shown in FIG. 9, the system 900 includes a so-called chipset 910. A chipset refers to a group of integrated circuits, or chips, that are designed to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (×16) PCI-E port for an external PCI-E-based graphics card. A system may include AGP or PCI-E for support of graphics.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface. One or more interfaces of the system 900 may be suitable for receiving, transmitting or receiving and transmitting information with a sensor such as an accelerometer (e.g., to effectuate orientation or other control).

The interfaces of the I/O hub controller 950 provide for communication with various devices, networks, etc. For example, the SATA interface 951 provides for erasing, reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 884 such as keyboards (KB), mice and various other devices (e.g., cameras, phones, storage, media players, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, a device or other machine may include fewer or more features than shown in the system 900 of FIG. 9. For example, the device 100 of FIG. 1 may include some or all of the features shown in the system 900 (e.g., as part of basic or control circuitry).

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
operating a 3-axis accelerometer having two axes that define a plane and an axis perpendicular to the plane to provide acceleration values for the three axes;
changing a trigger threshold value responsive to a change in magnitude of the acceleration value for the axis perpendicular to the plane according to a predefined relationship between magnitude of acceleration value for the axis perpendicular to the plane and trigger threshold value in a range from a minimum trigger threshold value to a maximum trigger threshold value wherein within the range the trigger threshold value increases with respect to an increase in the magnitude of the acceleration value for the axis perpendicular to the plane; and
orienting output to a display in either a portrait format or a landscape format based on comparing the acceleration values for the two axes that define the plane to the changed trigger threshold value.

2. The method of claim 1 wherein the trigger threshold value comprises a linear relationship with respect to the magnitude of the acceleration value for the axis perpendicular to the plane.

3. The method of claim 1 wherein the trigger threshold value comprises a non-linear relationship with respect to the magnitude of the acceleration value for the axis perpendicular to the plane.

4. The method of claim 1 wherein the acceleration value for the axis perpendicular to the plane corresponds to an angle with respect to gravity.

5. The method of claim 1 wherein changing the trigger threshold value comprises increasing the trigger threshold value responsive to an increase in the magnitude of the acceleration value for the axis perpendicular to the plane.

6. The method of claim 1 wherein changing the trigger threshold value comprises decreasing the trigger threshold value responsive to a decrease in the magnitude of the acceleration value for the axis perpendicular to the plane.

7. The method of claim 1 comprising, orienting output to the display in the portrait format based on comparing the acceleration values for the two axes that define the plane to the trigger threshold value.

8. The method of claim 7 wherein the orienting the output changes the output to the display from the landscape format to the portrait format.

9. The method of claim 1 comprising, orienting output to a display in the landscape format based on comparing the acceleration values for the two axes that define the plane to the trigger threshold value.

10. The method of claim 9 wherein the orienting the output changes the output to the display from the portrait format to the landscape format.

11. The method of claim 1 comprising dynamically changing the trigger threshold value responsive to the change in the magnitude of the acceleration value for the axis perpendicular to the plane.

12. The method of claim 1 comprising dynamically changing the trigger threshold value over a range of trigger threshold values responsive to dynamic changes in the magnitude over a range of magnitudes.

13. The method of claim 1 comprising, at a first time, changing the trigger threshold value to a first trigger threshold value responsive to a change in the magnitude of the acceleration value to a first acceleration value and, at a second time, changing the trigger threshold value to a second, different trigger threshold value responsive to a change in the magnitude of the acceleration value to a second, different acceleration value.

14. The method of claim 1 wherein a maximum value of the magnitude corresponds to a maximum value of the trigger threshold value.

15. The method of claim 14 wherein two different orientations of the 3-axis accelerometer generate a maximum in the magnitude of the acceleration value for the axis perpendicular to the plane wherein one of the two different orientations corresponds to the display being parallel to the plane and facing upwardly and wherein the other of the two different orientations corresponds to the display being parallel to the plane and facing downwardly.

16. One or more non-transitory computer-readable media comprising computer-executable instructions to instruct a device to:
operate a 3-axis accelerometer having two axes that define a plane and an axis perpendicular to the plane to provide acceleration values for the three axes;
change a trigger threshold value responsive to a change in magnitude of the acceleration value for the axis perpendicular to the plane according to a predefined relationship between magnitude of acceleration value for the axis perpendicular to the plane and trigger threshold value in a range from a minimum trigger threshold value to a maximum trigger threshold value wherein within the range the trigger threshold value increases with respect to an increase in the magnitude of the acceleration value for the axis perpendicular to the plane; and
orient output to a display in either a portrait format or a landscape format based on a comparison of the acceleration values for the two axes that define the plane to the changed trigger threshold value.

17. A device comprising:
a processor;
a planar display;
a 3-axis accelerometer having two axes that define a plane and an axis perpendicular to the plane to provide acceleration values for the three axes;
memory accessible to the processor; and
computer-executable instructions stored in the memory and executable to instruct the device to
change a trigger threshold value responsive to a change in magnitude of the acceleration value for the axis perpendicular to the plane according to a predefined relationship between magnitude of acceleration value for the axis perpendicular to the plane and trigger threshold value in a range from a minimum trigger threshold value to a maximum trigger threshold value wherein within the range the trigger threshold value increases with respect to an increase in the magnitude of the acceleration value for the axis perpendicular to the plane; and
orient output to the display in either a portrait format or a landscape format based on a comparison of the acceleration values for the two axes that define the plane to the changed trigger threshold value.

* * * * *